T. REUTER.
SYSTEM FOR OPERATING COMBUSTION ENGINES.
APPLICATION FILED SEPT. 13, 1910.
1,063,386.
Patented June 3, 1913.
2 SHEETS—SHEET 1.
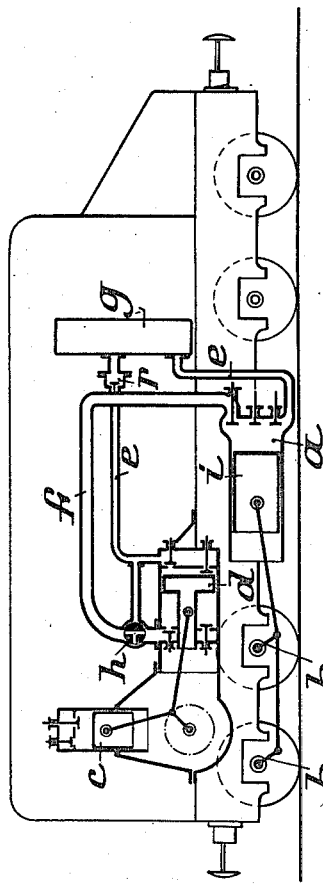
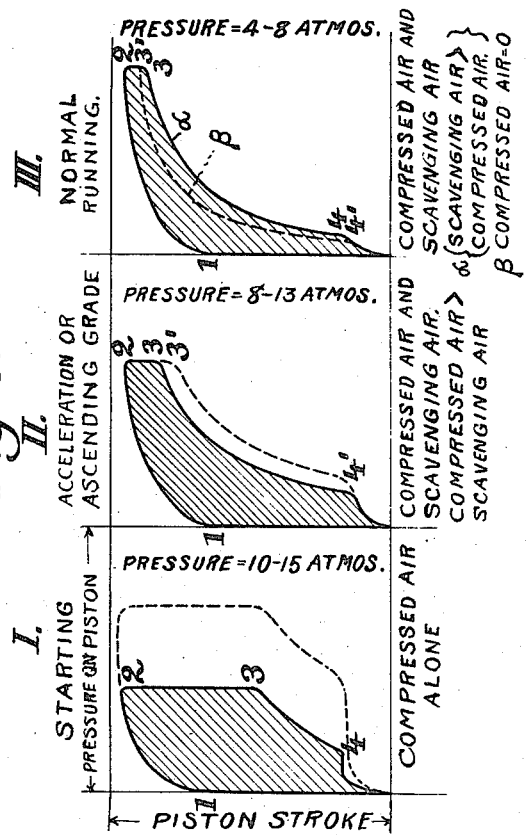
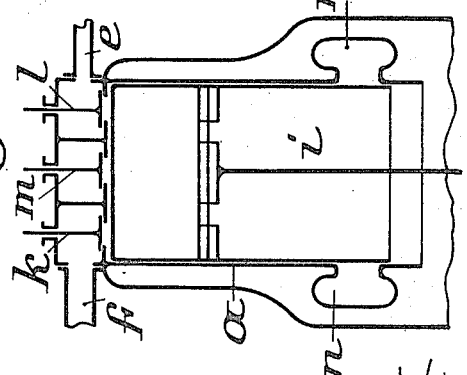

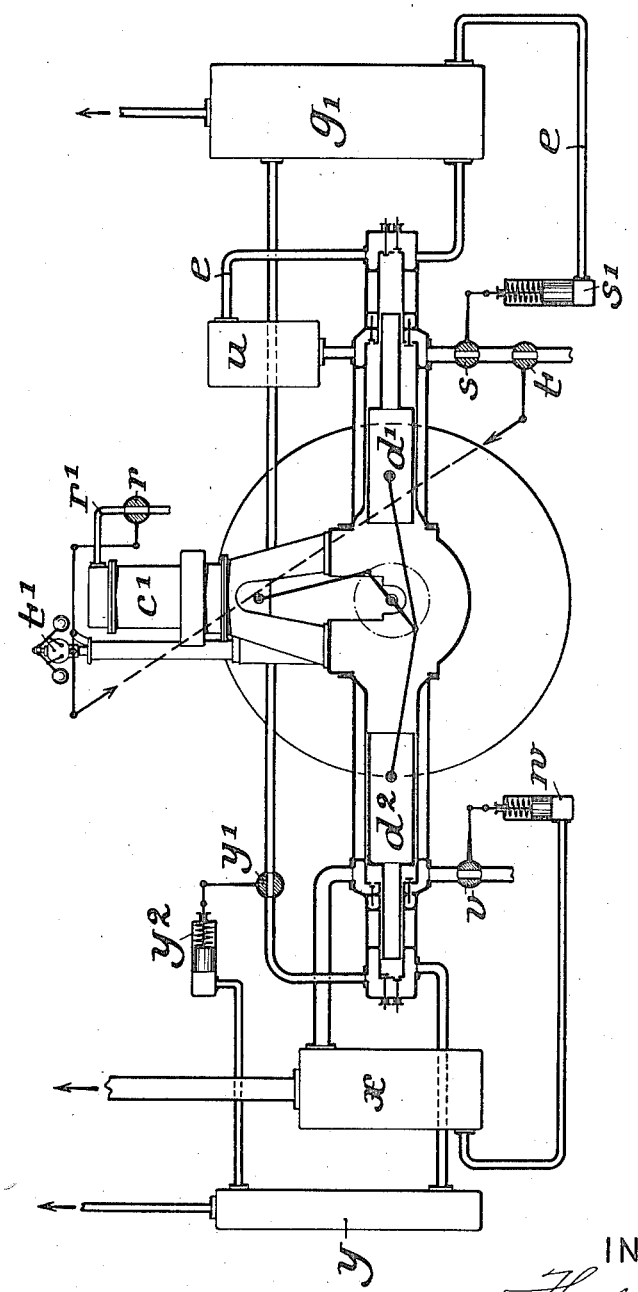

UNITED STATES PATENT OFFICE.

THEODOR REUTER, OF WINTERTHUR, SWITZERLAND.

SYSTEM FOR OPERATING COMBUSTION-ENGINES.

1,063,386.  Specification of Letters Patent.  Patented June 3, 1913.

Application filed September 13, 1910. Serial No. 581,862.

*To all whom it may concern:*

Be it known that I, THEODOR REUTER, a citizen of the Swiss Republic, residing at 24 Obere Wielandstrasse, Winterthur, Switzerland, have invented certain new and useful Improvements in Systems for Operating Combustion - Engines; and I do hereby declare the following to be a full, clear, and exact description of the invention, such as will enable others skilled in the art to which it appertains to make and use the same.

This invention relates to improvements in a system for operating combustion engines of the Diesel type, particularly such as are used for driving vehicles, and the object of the improvements is to provide a system in which the driving engine which acts on the axes of the vehicle is supplied with air for supporting combustion from an air pump or pumps which is or are operated independently of the driving engine, which air for supporting combustion consists in part of the scavenging or cleaning air, and in part of compressed air, the proportion of the scavenging air and the compressed air being variable according to the method of the operation of the system.

An important feature of the invention relates to automatic regulating means for the fuel supplying, scavenging, and compressed air supplied by the air pump or pumps or compressors and to the simultaneous regulation of the output of the subsidiary engines for the air supply, or the effect of the pumping apparatus for the coöperating subsidiary engine. This part of the invention consists in that the admission to the scavenging pump is regulated by an element which is controlled by the variable pressure of the scavenging air, and that the admission to the compressed air pump or pumps is regulated by an element which is controlled by the variable pressure of the compressed air as well as by a speed regulator which is driven by the subsidiary engine, while simultaneously the supply of blowing air or the air required for forcing the fuel into the cylinder is regulated at the inlet of the blowing pump by an element which is controlled by the variable pressure of the said blowing air, and the fuel supply to the subsidiary engines is regulated according to the output of the compressors as will hereinafter appear. The driving engine is controlled by the hand of the engineer. In order to enable the engineer to control the entire system the operation of the subsidiary engine, such that it will furnish the supply of the air required for all the different operations of the system, must be automatic.

Combustion engines for driving vehicles have heretofore been operated in the following ways: I. The driving engine which acts on the wheels of the vehicle is operated exclusively as a combustion engine when starting the vehicle as well as in the regular course of the latter, (motor vehicles with small starting resistances.) II. The driving engine acts exclusively as a compressed air engine when starting the vehicle as well as when in the normal course of the latter, the compressed air being supplied by a subsidiary engine acting as a combustion engine. III. When starting, the driving engine, acts exclusively as a compressed air engine, but in the normal course of the vehicle it acts as a combustion engine, the compressed air or the air for supporting combustion being supplied by the driving engine itself, or by subsidiary engines similar to those referred to under No. II.

This invention relates more particularly to improvements in the system referred to under No. III.

In order that the following description of the improved system may more clearly be understood, the terms: "combustion by means of scavenging air," "combustion by means of compressed air," and "combustion by means of combined compressed air and scavenging air" will first be explained.

Combustion by means of scavenging air indicates the combustion which takes place by means of the air which remains within the cylinder of the engine after driving the products of combustion out of the same by means of air, and which has been compressed to the combustion pressure. Combustion by means of compressed air indicates the combustion which takes place by means of the air which at the end of the compression is forced into the cylinder, and which has separately been compressed to the combustion pressure within a subsidiary cylinder. Combustion by means of combined scavenging air and compressed air indicates the combustion which takes place by means of scavenging air under the conditions referred to and by means of additional compressed air under the conditions referred to.

In the improved system the driving engine is exclusively driven by means of compressed air in starting, and during the normal course of the vehicle the engine acts as a combustion engine in which combustion takes place by means of compressed air and by means of scavenging air.

For the purpose of explaining the invention more in detail two examples embodying the same have been shown in the accompanying drawings in which the same letters of reference have been used in all the views to indicate corresponding parts.

In said drawings Figure 1 is a diagrammatical side view of the system, Figs. 2 and 3 are diagrams illustrating in conjunction the operation of the driving engine, and Fig. 4 is a diagrammatical side view similar to that shown in Fig. 1, and illustrating a modification of the system, and in addition automatic regulating means for the various apparatus of the same.

Referring to the example illustrated in Fig. 1 of the drawings, the driving cylinder $a$ of the driving engine acts on the driving shafts $b$ of the vehicle. In addition to the driving engine a subsidiary engine $c$ is provided which is constructed as a combustion engine, and which acts on an air pump or compressor $d$. With the same output of the subsidiary engine, the latter supplies definite proportions of scavenging air and compressed air, and the air which is required for forcing the fuel into the cylinder. The proportion of the scavenging air and of the compressed air supplied by the pump $d$ can be regulated by means of a regulating device such as a three-way cock $h$. The scavenging air supplied by the pump $d$ is conducted to the driving engine $a$ through a pipe $f$, and the compressed air is conducted thereto through a pipe $e$ and through a receptacle $g$ provided with a valve $r$.

The operation of the system appears from Figs. 2 and 3.

The working piston $i$ is disposed within the cylinder $a$ of the driving engine. The latter is principally different from the two cycle combustion engines of ordinary construction in that the compression of the scavenging air does not take place before the completion of the second third of the stroke of the piston taken from the lower dead point, which, as compared to the compression obtained in ordinary two cycle combustion engines (from 30 to 35 atmospheres), requires a decrease of the compression space to about one half of the ordinary (from 3 to 4% of the volume). A valve $k$ regulates the admission of the scavenging air, a valve $m$ the admission of the crude oil or other fuel, and a valve $l$ the admission of the compressed air. The exhaust ports $n$ control the exhaust of the products of combustion and, when the engine is being started, of the compressed air.

In order to show clearly the several phases of the operation of the driving engine under actual running conditions as, for example, when the installation is used for driving a railway locomotive, three pressure diagrams of the driving engine are shown in Fig. 3. These diagrams are placed sidewise as compared to the ordinary pressure diagrams of heat motors, so that the abscissæ, indicating the piston stroke, can be arranged parallel and coextensive with the path or stroke of the piston shown in Fig. 2. The ordinates, representing the cylinder pressure at the several phases of operation, extend at right angles to the cylinder and piston axis of Fig. 2. By comparing Fig. 2 with any one of the diagrams shown in Fig. 3, it can be seen at a glance just what pressure conditions exist in the driving cylinder at any given point in the piston strokes, i. e., the compression and working strokes. Diagram I shows the indicated pressure in the cylinder of the driving engine when the vehicle is being started; Diagram II shows the indicated pressure in said cylinder when the speed of the vehicle is increased or when the vehicle is driven up an incline; and Diagram III shows the indicated pressure in said cylinder under normal running conditions as when the vehicle is driven over a substantially or approximately horizontal stretch. Before taking up these individual diagrams in detail, it should be understood that the valves $k$, $m$, $l$, of the driving cylinder are operated at the proper time and in the proper sequence to effect the results hereinafter stated, by means of any well known valve operating mechanism, such as is usual in Diesel engines, and which forms no part of the present invention. In view of the numerous valve mechanisms of well known type which can be used for the purpose, I have not deemed it necessary to illustrate any one form of such mechanism. I have also omitted from the schematic illustration of Figs. 1 and 2 the particular means for blowing fuel into the cylinder through the valve $m$, in view of the fact that this feature in itself is also well known. It will be understood, of course, that the pumping mechanism of Fig. 1 is only illustrated diagrammatically, in simple form, in order to show more clearly the general principles of the invention, and that the invention contemplates the use of pumping or compressor mechanism of various types suitable to the purposes herein stated. In Case I the driving engine operates as a compressed air engine without combustion, and it is driven by means of the compressed air produced by the subsidiary engine. The operation of the driving engine is near the end of the compression (by the inward or up stroke of the piston) of the air left within the working cylinder, which compression begins at the point 1, the starting valve $l$ is opened, and the cylinder is filled with compressed air as the piston moves outward or downward on the working stroke during the period indicated in the diagram by the numerals 2—3 (Fig. 3, I). After the filling period is finished, as is indicated by the numeral 3, the compressed air expands within the cylinder, as the piston approaches the lower dead point, until the exhaust ports are opened, as is indicated by the numeral 4. After said exhaust ports are closed on the upstroke of the piston the expanded air is forced back in part into the conduit $f$ for the scavenging air which has been opened by the valve $k$. When the valve $k$ is again closed, a residue of slightly compressed air remains within the cylinder, and the said residue is further compressed on the compression stroke, during the period 1—2, to a moderate pressure which corresponds to the pressure of the compressed air of Case I (from 10 to 15 atmospheres). The entire effective power of the subsidiary engine is used for producing compressed air. This is made possible by means of the special controlling device $h$ of the pump $d$ by which the side of the piston which normally supplies scavenging air is connected with the pipes in such a way that they supply compressed air. In the example shown in Fig. 1 this connection is made by turning the three way cock $h$ at an angle of 90 degrees in an anti-clockwise direction. Thereby the left hand space of the cylinder of the pump $d$ communicates with the compressed air receiver $g$. In order to avoid an increase of the work of the subsidiary engine beyond the normal, notwithstanding the increase in the supply of compressed air, the pressure of the compressed air is reduced by throttling in case of the maximum output in compressed air. As compared to Cases II and III, the pressure of the compressed air is reduced to about one half or one third of the normal pressure of the combustion, that is to about 10 or 15 atmospheres. Corresponding to the low pressure of the compressed air the compression within the working cylinder of the driving engine is reduced. With reference to the beginning of the starting period it should be borne in mind, that when setting the cock $h$ to the maximum compressed air supply the compressed air receiver $g$ is already filled with compressed air of the permitted maximum pressure of about 35 atmospheres, and that when setting the pump to the increased supply of compressed air the supply does not begin, before the pressure within the receiver $g$ has been reduced to about one half or one third of what has been indicated above. Therefore the starting moment has a very high value, as is indicated in dotted lines in Fig. 3, Diagram I, while on the other hand the entire energy of the subsidiary engine is used for producing the compressed air and increasing the speed of the vehicle. To continue the operation of the engine with compressed air during the normal course of the vehicle would be practically objectionable by reason of the low efficiency and the low power output. Therefore in the present case as soon as a minimum speed has been attained at which the ignition and combustion can be obtained the increased supply of compressed air is stopped. Thereby with the same effective power of the subsidiary engine the pressure due to the compression can be increased to its normal value. In this case the cock $h$ is in the position shown in Fig. 1, in which the left pressure space of the pump cylinder $d$ is in communication with the receiver $f$ for the scavenging air. Thus when the supply of scavenging air has been started the cylinder of the driving engine is thoroughly scavenged with scavenging air, and the heat of the said scavenging air can if necessary be further increased by means of the exhaust gases from the subsidiary engine. This scavenging is the more effective the lower the speed of the driving engine as compared to the normal, and thereby the working cylinder which has been cooled by the starting operation is rapidly heated to a medium temperature at which with the normal compression ignition takes place.

In Fig. 3 the corresponding diagram has been indicated by the numeral II. The scavenging air which is within the cylinder after the scavenging valve $k$ has been closed (as is indicated by the point $l$ of the diagram) is compressed to the pressure which is necessary for self-ignition. At the point 2 the fuel supply valve $m$ is first opened, so that fuel is blown into the cylinder by blowing air as is usual in engines of this class, and after combustion by the scavenging air has been started additional compressed air and the fuel necessary for combustion by the latter are simultaneously admitted to the cylinder. In this case the compressed air valve is opened between the points 2 and 3. At the point 3 the burned mixture expands until at the point 4 the exhaust begins through the exhaust ports. When the pressure in the cylinder has fallen until it is substantially equal to that in the scavenging pipe or conduit the scavenging valve $k$ is opened, the scavenging air which is thus admitted forces the products of combustion through the exhaust ports, and is in part forced back into the scavenging conduit by the return stroke of the piston after the exhaust ports have been covered by the latter. Finally, at the point l the scavenging valve is again closed, and the operation is repeated. The amount of the scavenging air and of the compressed air supplied by the pump depends on the position of the cock h and the speed of the pump. If the position of the cock and the speed remain the same throughout the operation, the amount of the scavenging air and of the compressed air which is forced into the cylinder during each operation of the same and which is supplied by the pump is a function of the speed of the driving engine and of the subsidiary engine. But the amount of the scavenging air which in each operation remains within the cylinder of the driving engine and is used therein for combustion is independent of the ratio of the speeds of the driving engine and the subsidiary engine as long as the amount of the scavenging air supplied by the pump is larger than the scavenging air which can be received within the compression space of the cylinder of the driving engine, because a part of the scavenging air which is supplied in excess escapes through the exhaust ports, and with any low speed of the driving engine only so much scavenging air remains within the working cylinder as corresponds to the size of the compression space. On the other hand all the compressed air supplied to the cylinder is made use of for combustion. Therefore though the amounts of scavenging air and of compressed air supplied by the pump within the unit of time and for each operation of the driving engine are always in a constant ratio to each other, yet the burned amounts of scavenging air and compressed air are at a variable ratio, so that in case of low speeds of the driving engine a larger amount of compressed air, and in case of higher speeds of the driving engine a larger amount of scavenging air is used for combustion. The diagrams which correspond to the charge of compressed air or the speed of the engine show in such a degree higher average indicated pressures as compared to the diagrams of ordinary combustion engines, as the combined charge of scavenging and compressed air is larger than the ordinary compression space.

When the driving engine has assumed its normal speed its diagram will be the one shown in Fig. 3 III. The working and combustion process is the same as described with reference to Case II, and it is distinguished from the latter merely in that by reason of the smaller compressed air charge the fuel valve m and the compressed air valve l are closed earlier near the point 3. As before, the charge of compressed air varies according to the speed of the engine. In case of lower speeds the larger Diagram A, namely 1—2—3—4—1, and in case of higher speeds the Diagram B, namely 1—2—3'—4'—1 are indicated. The last named (minimum) diagram is the one which is indicated if there is no compressed air supply at all. It is to be noted that in Case II, the dotted line 3', 4', is indicated if the volume of compressed air is increased. In the case of Diagram III (maximum speed) the scavenging air supply of the pump would not be sufficient with a single acting pump piston to supply for each operation the necessary amount of air which corresponds to the compression space, the cock h is so set, that all the pistons of the pump are used to supply scavenging air. The average indicated pressure of the diagram drawn with the largest fuel charge and exclusively scavenging air filling is from 4 to 5 atmospheres, according to the size of the compression space of 4 or 5% of the entire space described by the stroke of the piston.

It is a characteristic feature of the improved system, that the subsidiary engine is perfectly utilized in starting and in the normal course of the vehicle while the efficiency is simultaneously increased as the effect and the speed of the driving engine are increased. In systems heretofore in use it is not possible to combine both of these advantages, that is maximum economy and maximum specific effect of the system. In the improved system both advantages can be availed of by the variation of the production and utilization of the scavenging air and compressed air. Therefore the economical and practical advantages of the combined compressed air and scavenging air method are based on the following:

1. The safety of the operation is increased because the scavenging air removes the cold starting air from the driving cylinder after the vehicle has been started, and has a heating effect on the cylinder walls, which have been cooled by the starting air; while in the normal operation the scavenging air forces out of the cylinder the highly heated exhaust-gases and thereby exerts a cooling effect on the relatively hot cylinder walls. In other words, the scavenging air is hot relative to the cold starting air, and cold in comparison to the exhaust gases, all of which results in bringing the temperature of the cylinder walls quickly to the desired point when the combustion operation is started, and maintaining such heat as said operation progresses.

2. The diagrams readily follow various conditions, such as starting, acceleration, ascending grades, normal traveling, etc., by reason of the constant charge of scavenging air and the variable charge of compressed air.

3. In the normal operation the system is economical, because the scavenging air charge is larger than the compressed air charge.

4. The system is utilized to a maximum output, because in all the different operations the subsidiary engine is completely utilized.

In the modification of the system illustrated in Fig. 4 of the drawings, the subsidiary engine $c'$ acts on two compressors $d'$ and $d^2$ which are disposed within the same plane. The section $d'$ of the pump supplies compressed air. The air to be compressed is drawn in through regulating devices $s$ and $t$, and after having passed the first stage of the compression it is forced into a cooling receiver $u$, and after having passed the second stage of the compression it is supplied to the receiver $q'$. The regulating device $s$ is controlled by an element $s'$ which follows the variations of the pressure of the compressed air, and which in the drawing has been shown as a piston which is held in equilibrium by the compressed air and by a spring. If the pressure of the compressed air is increased beyond a certain value which can be set by the spring, the regulating device $s$ closes the admission of the air. The regulating device $t$ is controlled independently of the regulation by the device $s$ by means of a speed regulator $t'$ in such a way, that if the speed of the subsidiary engine falls below a minimum the said speed regulator closes the device $t$, while with higher speeds it holds the said device in its open position. Therefore the supply of the compressed air is stopped, if the pressure of the compressed air rises beyond a certain value, or if the speed of the subsidiary engine falls below a certain value. The pump $d^2$ supplies the scavenging and blowing air. The scavenging air to be supplied by the said pump is drawn in through a regulation device $v$, and it is supplied to a receiver $x$. The regulating device $v$ is controlled by a device $w$ which follows the variations of the pressure of the scavenging air, and which, if the said scavenging pressure is increased beyond a certain value, closes the admission of the air by means of the device $v$. The blowing air is drawn in from the compressed air receiver $q'$ through a regulating device $y'$ from which it flows into the receiver $y$. The regulating device $y'$ is controlled by a device $y^2$, and it is closed at a certain blowing pressure which can be set beforehand. A fifth regulating device $r$ which is controlled by speed regulator $t'$ of the subsidiary engine $c'$ controls the fuel admission $r'$ to the subsidiary engine in such a way that, if a maximum speed is attained, the fuel supply is cut off. By the coöperation of the five regulating devices referred to the air supply is automatically effected for all the different operations.

In Fig. 4 the regulating devices have been shown in the positions which they assume in the normal operation in which the full amounts of the compressed air, the scavenging air, and the blowing air are supplied. In case the system is used for driving a vehicle, the said positions correspond to the normal travel on the horizontal and with the highest effect and the highest speed. If for example the supply of compressed air to the driving engine is reduced for any reason, such for example as for reducing the speed on curves, or reducing the effect on down grades, the pressure of the compressed air is increased to a maximum value which is determined by the element $s'$. At the maximum speed the subsidiary engine $c'$ develops its maximum effect, and the admission conduit $r'$ is entirely opened by the element $r'$ If the pressure tends to increase beyond its allowed maximum, the air inlet to the pump $d'$ is throttled and finally closed by the regulating devices $s$ and $s'$. Thereby the supply of compressed air is entirely or in part cut out, and on the other hand the entire effective energy of the compressor is reduced, so that the subsidiary engine $c'$ assumes a speed which is above the normal. Therefore the regulating device $r$ is actuated by the speed regulator $t'$, and the fuel supply is so regulated that the effective energy of the subsidiary engine is equal to the effective energy of the compressor. The limit of this regulation is attained in case the vehicle is at rest. In this case the regulating devices $s$ and $s'$, $v$ and $w$, $y'$ and $y^2$ close the admission of the air, as soon as the maximum pressures are attained in the various receivers, the compressor is actuated without any useful work, and the effect of the subsidiary engine has been throttled to no effective work by the regulating device $r$. If now the vehicle is again started, air must be supplied from all the receivers. The pressures within the latter are thereby reduced and the aforesaid regulating devices $s$, $s'$, $v$, $w$, $y'$, and $y^2$ are again opened. By reason of the decrease of the speed upon the beginning of the air supply the regulating device $r$ opens the fuel admission to the subsidiary engine, and adjusts the effect of the same according to the effect of the compressor, or according to the air supply.

In the regulating operations so far described the regulating device $t$ which upon a decrease of the speed below a minimum throttles the compressed air supply has not come into action. This device is thrown into operation, if the effective maximum energy of the subsidiary engine for each revolution is smaller than the effective energy of the compressor in case of full air admission thereto and maximum pressures. This case must be considered in view of the dimensions of the apparatus required for practical reasons. In this case when a certain pressure of the compressed air has been attained, the effective maximum power of the subsidiary engine would just be sufficient to drive the compressor; if the said pressure is larger, but possibly below the maximum pressure of the compressed air, the subsidiary engine would be wholly arrested. Therefore the regulating device $t$ is provided which can be considered as a power regulator for the air compressing apparatus. Therefore the speed regulator $t'$ has two functions; within the higher speeds it controls the fuel supply to the subsidiary engine and adjusts, in case of a constant maximum speed, the effect of the subsidiary engine according to the output of the compressor, and in the lower speeds it acts on the air admission to the compressor in case of constant minimum speed and it adjusts the output of the said compressor according to the maximum effect of the subsidiary engine.

While in describing the invention reference has been made to the use of the improved system in driving vehicles, it should be understood, that the invention is not limited to such use, and that the improved system may advantageously be used in locomotives, and ships, and for entirely different purposes, in which conditions similar to those referred to prevail.

Claims:

1. The method of operating a two cycle internal combustion engine of the Diesel type, wherein combustion is supported in part by compressed air and in part by scavenging air, which comprises admitting fuel to the cylinder and so regulating the relative amounts of compressed and scavenging air that the compressed air supply decreases as the load on the engine decreases, while the scavenging air supply increases correspondingly, substantially as described.

2. The method of operating an internal combustion engine of the two-cycle Diesel type, wherein combustion is supported in part by compressed air and in part by scavenging air, which comprises admitting fuel to the cylinder and so regulating the relative amounts of compressed and scavenging air respectively consumed in the engine cylinder, that the amount of scavenging air consumed increases with the decrease in load on the engine, while the compressed air consumed decreases; substantially as described.

3. The method of operating a two-cycle internal combustion engine, wherein combustion is supported by separate supplies of compressed and scavenging air, generated outside of the engine, which consists in starting the engine on compressed air alone, then, after starting, admitting fuel to the cylinder and changing over to combustion with both compressed and scavenging air, and finally, as the speed of the engine increases, increasing the supply of scavenging air and decreasing the supply of compressed air, substantially as described.

4. The method of operating a two-cycle internal combustion engine, wherein combustion is supported in part by scavenging air compressed outside of the engine cylinder and in part by compressed air, also compressed outside of the engine cylinder, which comprises admitting fuel to the cylinder and so regulating the supplies of compressed and scavenging air that the former decreases as the load on the engine decreases, while the scavenging air supply increases correspondingly, substantially as described.

5. The method of operating a two-cycle internal combustion engine wherein combustion is supported in part by compressed air supplied from a suitable exterior source, and in part by scavenging air supplied from a suitable exterior source, which comprises admitting fuel to the cylinder and increasing the supply of scavenging air to the cylinder as the speed of the engine increases, and simultaneously decreasing the compressed air supply, substantially as described.

6. The method of operating a two-cycle internal combustion engine, wherein combustion is supported in part by compressed air, and in part by scavenging air, which comprises starting the engine on the compressed air alone, without combustion, then changing over to combustion with fuel and combined compressed and scavenging air, with the compressed air in excess of the scavenging air, then, as the load on the engine decreases and the speed increases, so regulating the amounts of scavenging and compressed air, supplied to the cylinder, that the scavenging air is in excess of the compressed air, and finally, as the load on the engine further decreases, cutting off entirely the compressed air supply so that combustion is supported by scavenging air alone, substantially as described.

7. The method of operating a vehicle power installation comprising a two-cycle driving engine, a subsidiary engine, an air pumping mechanism operated by the subsidiary engine, which consists in starting the driving engine by admitting thereto compressed air charges without combustion, then changing over to combustion supported by charges of fuel and compressed and scavenging air, the compressed air charges being cut off entirely when the driving engine is under minimum load, substantially as described.

8. The method of operating a vehicle power installation comprising a driving engine of the two-cycle Diesel type, wherein combustion is supported in part by compressed air charges compressed outside of the driving cylinder, and in part by scavenging air charges likewise compressed outside of the driving cylinder, which consists in starting the vehicle by supplying compressed air alone to the driving cylinder, without combustion, then, as the speed is accelerated, or as the vehicle ascends an incline, changing over to combustion with fuel and combined scavenging and compressed air, the compressed air being in excess of the scavenging air, and during the normal running of the vehicle on substantially horizontal roads, so regulating the charges of compressed and scavenging air that the latter is in excess of the former, substantially as described.

9. The method of operating a vehicle power installation comprising a main driving engine of the two-cycle Diesel type, and means for supplying charges of fuel and compressed and scavenging air to the cylinder of said engine, which consists in starting the vehicle by admitting compressed air charges alone to the driving cylinder, so that the engine operates as a compressed air engine, changing over to combustion with fuel and combined compressed and scavenging air, after the vehicle has been started, so regulating the relative amounts of compressed and scavenging air supplied to the engine cylinder that the compressed air is in excess of the scavenging air when the vehicle is getting up speed or ascending an incline, and that the scavenging air is in excess of the compressed air during normal running, and cutting off entirely the compressed air charges as the driving engine assumes a minimum load, as on descending grades, whereby the engine then operates with combustion of scavenging air alone; substantially as described.

10. A power installation for vehicles and the like comprising a main driving engine of the two-cycle internal combustion type, means to supply the cylinder of said engine with charges of scavenging and compressed air, and means to vary the amounts of the scavenging and compressed air charges relatively to each other, as called for by the conditions under which the engine operates, substantially as described.

11. A power installation for vehicles and the like comprising a main driving engine of the two-cycle Diesel type, means to supply the cylinder of said engine with charges of scavenging air, means to supply said cylinder with charges of compressed air, and means for varying the amounts of the scavenging and compressed air charges, substantially as described.

12. A power installation such as described, comprising a main driving engine of the two-cycle internal combustion type, means to supply the cylinder of said engine with scavenging air, means to supply said cylinder with compressed air, and means for simultaneously varying the charges of compressed and scavenging air, substantially as described.

13. A power installation for vehicles comprising a two-cycle internal combustion engine having the usual exhaust ports and equipped with a compressed air valve and a scavenging air valve, means to supply the engine cylinder with compressed air through the compressed air valve, means to supply said cylinder with scavenging air through the scavenging air valve, and means for simultaneously increasing the amount of air supplied through one of said valves and decreasing the amount of air supplied through the other valve, substantially as described.

14. A power installation such as described comprising a main two-cycle internal combustion engine, a subsidiary engine, pumping mechanism operated by the subsidiary engine and comprising means to supply separate charges of scavening and compressed air to the cylinder of the main engine, and means for varying and cutting off such charges; substantially as described.

15. A power installation such as described comprising a main driving engine of the two-cycle internal combustion type, a subsidiary engine, air pumping mechanism operated by the subsidiary engine and including means to supply the cylinder of the main engine with separate charges of scavenging and compressed air respectively, and means for varying the compressed air charges of the cylinder and the scavenging air charges with respect to each other, and for cutting off either of said charges, substantially as described.

16. A power installation such as described comprising a main driving engine of the two-cycle internal combustion type, a subsidiary engine, air pumping mechanism operated by the subsidiary engine and including a scavenging air connection with the cylinder of the main driving engine, and a compressed air connection with said cylinder, and means for establishing communication between said pumping mechanism and either of said connections, substantially as described.

17. The combination with a main driving engine of the two-cycle type having a compressed air valve and a scavenging valve, of a subsidiary engine, air pumping mechanism operated by the latter and including separate connections leading to said compressed air valve and said scavenging air valve respectively, and a single device operable to close either of said connections and to vary the scavenging and compressed air charges relatively to each other, substantially as described.

18. The combination with a main driving engine of the two-cycle internal combustion type, of a subsidiary engine, air pumping mechanism operated by the latter and including compressed air and scavenging air connections respectively with the cylinder of the main driving engine, and means to so control said connections that the entire output of the pumping mechanism may be utilized as either compressed or scavenging air, substantially as described.

19. The combination with a main driving engine of the two-cycle internal combustion type, of a subsidiary engine, air pumping mechanism operated by the latter, and means to connect said pumping mechanism with the cylinder of the main engine so that the entire output of the pumping mechanism may be used as either compressed air or scavenging air and so that scavenging air and compressed air can be supplied to said cylinder in a variable ratio, substantially as described.

20. The combination with a main driving engine of the two-cycle Diesel type, of a subsidiary engine, and separate air pumps operated by the latter, one of said air pumps supplying both scavenging and fuel supplying air to the main engine cylinder, and the other pump supplying compressed air to said cylinder, substantially as described.

21. The combination with a main driving engine of the two-cycle Diesel type, of a subsidiary engine, separate pumps operated by the latter, one for supplying compressed air charges to the cylinder of the driving engine, and the other being operative to supply scavenging air charges to said cylinder, means to regulate the supply of air to the scavenging air pump in accordance with the variable pressure of the scavenging air supplied by said pump, and means to regulate the admission of air to the compressed air pump in accordance with the variable pressure of the compressed air being supplied by the latter, substantially as described.

22. The combination with a main driving engine of the Diesel type, of a subsidiary engine, separate air pumps operated by the latter, one of said pumps supplying compressed air to the cylinder of the main engine, and the other supplying scavenging and fuel blowing air to said cylinder, means to regulate the admission of air to the compressed air pump in accordance with the variable pressure of the air supplied thereby, means to regulate the admission of air to the scavenging pump cylinder in accordance with the variable pressure of air supplied by the latter, and means for regulating the admission of air to the blowing pump cylinder in accordance with the variable pressure of the blowing air supply, substantially as described.

23. The combination with a main driving engine of the Diesel type, a subsidiary engine, air pumping mechanism operated by the latter and connected with the cylinder of the main engine to supply the latter with separate charges of compressed and scavenging air, and a speed regulator operated by the subsidiary engine and arranged to regulate the supply of fuel to said engine in accordance with the effect of the pumping mechanism at the higher speeds, substantially as described.

24. The combination with a main driving engine of the Diesel type, of a subsidiary engine, air compressors operated by the latter and arranged to supply the cylinder of the main driving engine with separate charges of compressed, scavenging, and fuel blowing air, and a speed regulator operated by the subsidiary engine and arranged to regulate the admission of fuel to the subsidiary engine at the higher speeds in accordance with the output of the compressors, said regulator also restricting the admission of air to at least one of said compressors at the lower speeds, substantially as described.

In testimony whereof I have affixed my signature, in presence of two witnesses.

THEODOR REUTER.

Witnesses:
ALBERT GUYER,
RUDOLF MATOSS.